United States Patent [19]
Prario

[11] Patent Number: 4,687,413
[45] Date of Patent: Aug. 18, 1987

[54] GAS TURBINE ENGINE ASSEMBLY

[75] Inventor: Aldo Prario, Wethersfield, Conn.

[73] Assignee: United Technologies Corporation, Hartford, Conn.

[21] Appl. No.: 761,136

[22] Filed: Jul. 31, 1985

[51] Int. Cl.⁴ ............................................. F04D 29/54
[52] U.S. Cl. .................................... 415/190; 415/217;
    415/174; 403/319; 403/355
[58] Field of Search ............... 415/189, 190, 191, 216,
    415/217, 218, 174, 170 R, 196, 199.5; 416/220
    R; 60/39.75; 403/319, 355, 356, 358

[56] References Cited

U.S. PATENT DOCUMENTS

| | | | |
|---|---|---|---|
| 2,357,709 | 9/1944 | Truex | 415/218 |
| 2,915,281 | 12/1959 | Ridley et al. | 415/218 |
| 2,928,586 | 3/1960 | Hart | 415/218 |
| 2,974,928 | 3/1961 | Ridley | 415/217 |
| 3,104,091 | 9/1963 | Vivian | 415/190 |
| 3,644,057 | 2/1972 | Steinbarger | 415/218 |
| 4,219,286 | 8/1980 | Lindenthal | 403/355 X |
| 4,573,875 | 3/1986 | Emeterio et al. | 403/355 X |

FOREIGN PATENT DOCUMENTS 586562 3/1947 United Kingdom ................ 415/190

Primary Examiner—Edward K. Look
Attorney, Agent, or Firm—James M. Rashid

[57] ABSTRACT

Annular, circumferentially segmented components of a gas turbine engine are secured to a support structure by C-shaped couplings which prevent movement of the components in a radial and circumferential direction. The coupling has spaced apart legs which trap the component and support structure therebetween, and a key between the legs which engages a keyway formed by cooperating slots in the component and support structure.

7 Claims, 4 Drawing Figures

GAS TURBINE ENGINE ASSEMBLY

DESCRIPTION

1. Technical Field

The present invention relates to couplings, and in particular, to couplings for attaching gas turbine engine stator vanes to a support structure.

2. Background Art

The turbine section of a gas turbine engine includes an annular outer casing. Stator vanes, individually or in clusters, are often attached to the outer casing, and extend radially inwardly across a gas flow path. The prior art describes bolted constructions (U.S. Pat. Nos. 4,247,248 and 4,485,620) and annular retaining rings (U.S. Pat. No. 4,425,078) for attaching the vanes to the engine case. However, both of these types of assemblies require precision machining of various engine components, and both add undesired weight to the engine. Another attachment construction utilizes circumferentially segmented, arcuate, interlocking flanges which prevent radial movement of the vanes. For example, in U.S. Pat. No. 4,363,599, the flanges are integral with the vane platform. In another construction, used in some engines manufactured by Pratt & Whitney, a division of United Technologies Corporation, and shown in FIG. 1, radially spaced apart flanges 10, 12 are integral with a segment 14 of an annular outer air seal. The flanges radially secure the rear foot 16 of a vane cluster 18 to a case rail 20. The rear foot 16 is trapped between ridges 22, 24 which extend radially from the rail 20, and which prevent relative axial movement between the vane cluster 18 and rail 20. Movement of the cluster 18 in a circumferential direction relative to the engine casing 26 is prevented by axially extending pins 28 secured to the casing 26 which engage slots 30 in the cluster front foot 32. Machining of the holes which hold the pins 28, and the slots 30 in the cluster foot 32, as well as fabrication of the seal flanges 10, 12, is difficult and time consuming. Additionally, assembly of the pins 28 and the clusters 18 to the casing 26 is time consuming, and therefore costly.

Other patents which show the general state of the art in the field of vane attachment are U.S. Pat. Nos. 2,985,426, 2,994,506, 3,000,613, 3,098,357, 3,853,425, 3,940,459, 3,943,703, 4,192,633, 4,311,432, United Kingdom Patent No. 671,960 (May 14, 1952) and Italian Patent No. 459,735 (Oct. 4, 1950).

DISCLOSURE OF INVENTION

An object of the present invention is an improved coupling for preventing movement of segmented gas turbine engine components relative to a support structure.

Another object of the present invention is an improved, low cost, low weight, and easy to fabricate coupling for securing stator vanes to an engine casing.

According to the present invention, annular, circumferentially segmented components of a gas turbine engine are secured to a support structure by C-shaped couplings which prevent movement of the components in a radial and circumferential direction.

More specifically, each platform of a stator vane cluster of a stage of stator vanes has an axially extending flange in overlapping contact with an axially extending annular rail of a support structure. The overlapping portions are held between axially extending legs of a C-shaped coupling, and the legs prevent relative radial movement between each segment and the rail. The rail has a plurality of circumferentially spaced apart and axially extending slots therein, each of which is radially aligned with an axially extending slot in each flange to form a plurality of keyways. A key integral with each coupling and disposed between the coupling legs engages each keyway and prevents circumferential movement between each vane cluster and the rail.

The simple design of the vane attachment construction of the prevent invention makes its use far more attractive than prior art assemblies. Fabrication of the coupling is relatively easy, and complex details do not feed to be machined into the support structure or the vane clusters. Additionally, assembly and disassembly of the coupling in the engine is easier, thus reducing assembly/disassembly time.

The foregoing and other objects, features and advantages of the present invention will become more apparent in the light of the following detailed description of the preferred embodiments thereof as illustrated in the accompanying drawing.

BEST MODE FOR CARRYING OUT THE INVENTION

Figure 2:
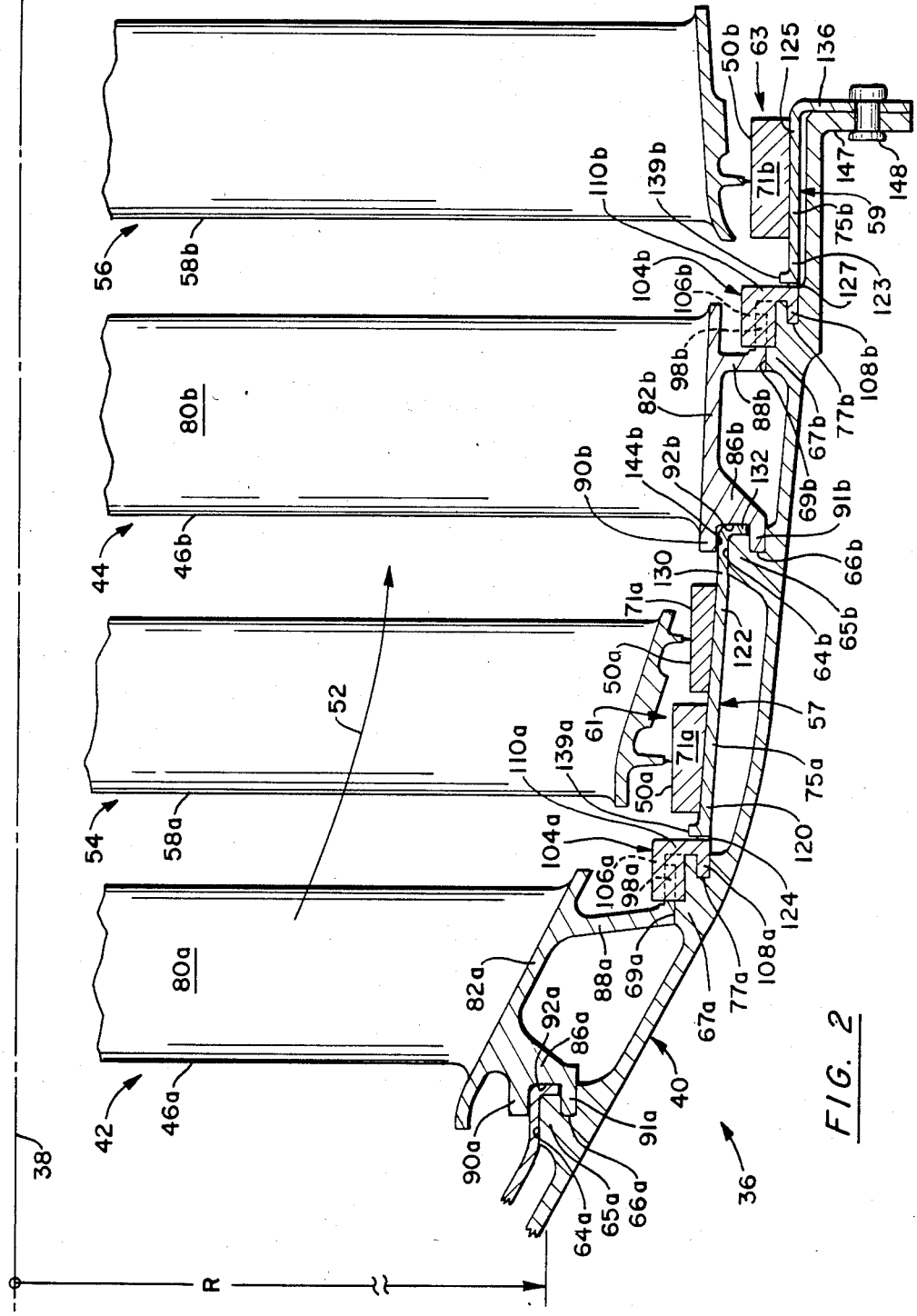
FIG. 2 is a simplified sectional view of a portion of the turbine section of a gas turbine engine which incorporates the features of the present invention.
Figure 3:
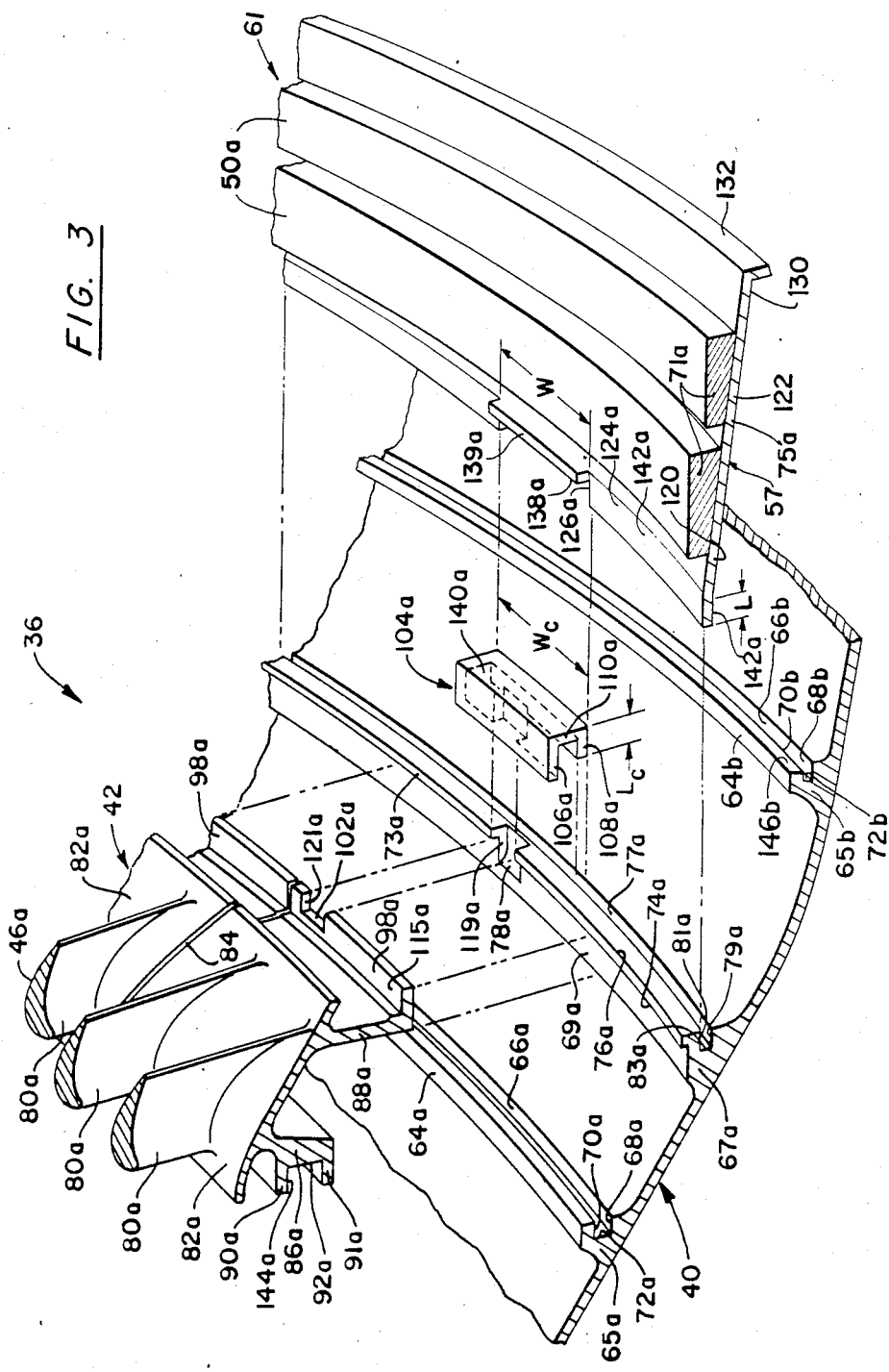
FIG. 3 is a perspective, exploded view of a portion of the turbine section of FIG. 2, showing a stator and seal stage assembly which incorporates the features of the present invention.

As an exemplary embodiment of the present invention, consider the portion of a turbine section 36 of an axial flow gas turbine shown in FIGS. 2 and 3. The turbine section 36 includes an annular engine case 40, and a first and second annular stator stage 42, 44, respectively. (The second stator stage 44 is not shown is FIG. 3.) The first stator stage 42 includes a row of stator vane units 46a (hereinafter referred to as "stator vane clusters", since in this embodiment, each unit includes more than one vane), and the second stator stage 44 includes a row of stator vane clusters 46b. The clusters 46a, 46b are arranged circumferentially about the axis 38 of the engine, and are attached, by means to be described below, to the engine case 40. As shown in FIG. 2, a first annular rotor stage 54 is disposed between the first and second stator stages, and a second annular rotor stage 56 is disposed between the second and a third stator stage (not shown). Each stage 54, 56 includes a circumferentially disposed row of blades 58a, 58b, respectively. Each row of blades 58a, 58b is attached to a disk (not shown) which rotates about the engine axis 38. The axis 38 is a distance R from the engine case 40.

In the drawing, functionally equivalent elements of the turbine section are given the same reference numeral, and suffix "a" is added to the reference numeral to designate first stage elements, while the suffix "b" is added to the reference numeral to designate second stage elements. Hereinafter, the suffixes "a" and "b" are used to differentiate first and second stage elements only when necessary.

A first annular seal stage 57 is disposed radially outward of the first stage of rotor blades 58a, and a second annular seal stage 59 is disposed radially outward of the second stage of rotor blades 58b. Each seal stage 57, 59 includes a plurality of circumferentially disposed, abutting, arcuate seal segments 61, 63, respectively, attached to the case 40. Each seal segment 61, 63 includes an abradable rubstrip 71 which extends radially inwardly from a seal support 75. A radially inwardly facing side 50 of each rubstrip 71 defines the outer boundary of a gas flow path 52. The inner boundary of the gas flow path 52 is not shown in the Figures.

The engine case 40 has a pair of annular, radially inwardly extending and axially spaced apart front and rear rails 65, 67 for each of the stator stages 42, 44. Each of the rails 65, 67, has a radially inwardly facing surface 64, 69, respectively. A rearward facing annular groove 66 extends axially into each of the rails 65; similarly, a rearward facing annular groove 77 extends axially into each of the rails 67. Each groove 66 has radially inwardly and outwardly facing annular surfaces 68, 70, respectively, and a surface 72 extending therebetween. Each groove 77 has radially inwardly and outwardly facing annular surfaces 79, 81, respectively, and a surface 83 extending therebetween. Preferably, the radially facing surfaces 68, 70 are concentric cylinders, as are the radially facing surfaces 79, 81. Each of the rails 67 has a lip 73 which extends radially inwardly from the surface 69. The lip 73 has axially forward and rearward facing surfaces 74, 76, respectively. A plurality of spaced apart slots 78 extend axially through each lip 73 and radially into each rail surface 69. The slot 78 does not penetrate into the groove 77 in the rail 67.

Each vane cluster 46 includes a plurality of airfoil shaped vanes 80 which extend radially inwardly from an arcuate platform 82. As noted above, the clusters 46 are arranged circumferentially about the engine axis 38; the platforms 82 of adjacent clusters abut each other, and have an axially extending interface 84 therebetween. Each platform 82 is supported by radially outwardly extending front and rear legs 86, 88, respectively. Each cluster front leg 86 has a pair of radially spaced apart flanges 90, 91, or feet, which extend in the axially forward direction. An axially facing surface 92 extends between the feet 90, 91. Each cluster rear leg 88 has a rear foot 98 extending in the axially rearward direction, and an axially extending slot 102 therethrough. The circumferential width of each foot slot 102 is substantially equivalent to the circumferential width of each rail slot 78. Each foot slot 102 is radially and axially aligned with a rail slot 78, and the slots 78, 102 cooperate to form a plurality of axially entending keyways.

According to the teachings of the present invention, the radially outer front foot 91 of each cluster 46 of the first and second stator stage 42, 44, respectively, is disposed within the groove 66 of its respective stage rail 65, and abuts the groove surface 72, whereby movement of the foot 91 in the forward axial direction is prevented. The rear foot 98 of each cluster 46 is disposed in overlapping contact with the surface 69 of its respective stage rail 67, and abuts the lip surface 74, whereby movement of the foot 98 in the rearward axial direction is prevented. Thus, the vane clusters 46 are trapped between the rails 65, 67 and cannot move in either the forward or rearward axial direction.

Figure 4:
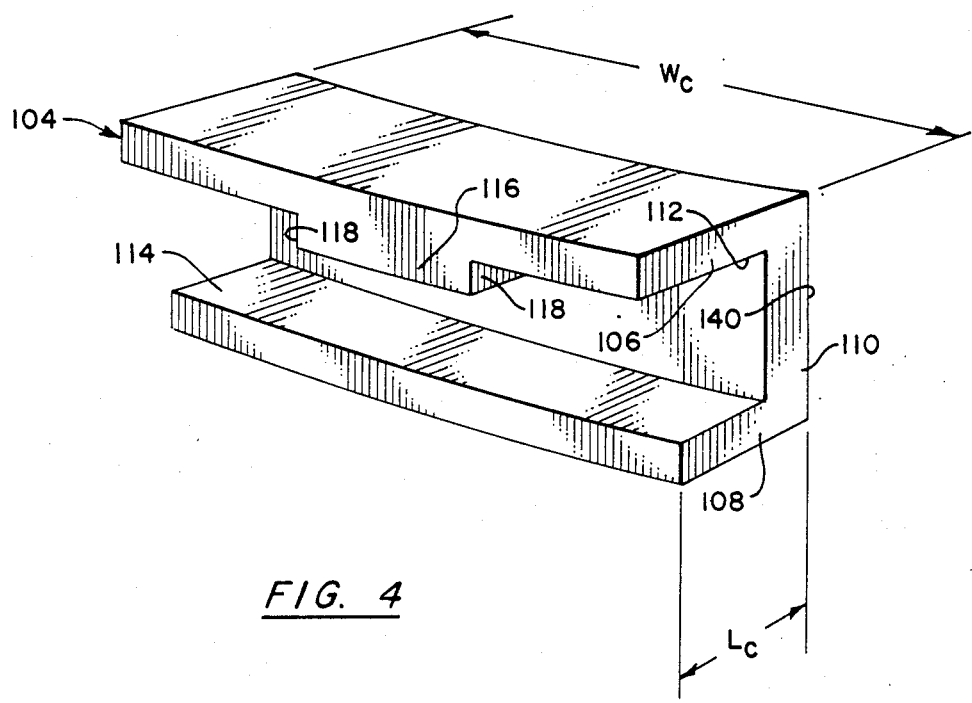
FIG. 4 is a perspective view of a coupling used in the vane attachment construction of the present invention.

Movement of the vane clusters 46 in radial and circumferential directions relative to the case 40 is prevented by arcuate C-shaped couplings 104 which cooperate with the case 40 as described hereinbelow. To better understand how the couplings 104 provide radial and circumferential retention of the vanes 46 to the case 40, reference is made to FIG. 4. Each coupling 104 has radially spaced apart legs 106, 108, which are integral with and extend axially from a back 110. The leg 106 has a radially outwardly facing surface 112 and the leg 108 has a radially inwardly facing surface 114. The leg 108 is disposed within a groove 77 of a rail 67, and the inwardly facing surface 114 of the leg 108 mates with the outwardly facing surface 81 of the groove 77. At the same time, the outwardly facing surface 112 of the leg 106 mates with the inwardly facing surface 115 of a cluster rear foot 98. Thus, the overlapping portions of the rail 67 and the cluster rear foot 98 are tightly disposed between the coupling legs 106, 108, and relative radial movement between the rear foot 98 and the rail 67 is prevented. The cluster outer front foot 91, being disposed within the groove 66 of the rail 65 as described above, is radially trapped between the surfaces 68, 70 of the groove 66, and movement of the foot 91 in the radial direction is thereby prevented. Consequently, the cluster front and rear feet, 91, 98, respectively, and thus the vane cluster 46, is fixed radially relative to the case 40.

Each coupling 104 has a key 116 located between the coupling legs 106, 108, and which extends axially in the same direction as the legs 106, 108. The key 116 is integral with the leg 106 and with the back 110, and is radially spaced from the leg 108. As noted above, the slot 102 in the rear foot 98 of each vane cluster 46 is radially aligned with and cooperates with one of the slots 78 in the rail 67 to form an axially extending keyway. Circumferentially facing walls 118 of the key 116 engage opposing walls of the keyway (i.e., radially extending and cooperating walls 119, 121 in the rail slot 78 and foot slot 102, respectively) and, as a result, neither the cluster 46 nor the coupling 104 can move in the circumferential direction relative to the case rail 67.

It should be apparent that the slot 78 in the rail 67 could extend completely through the rail 67 and intersect the groove 77. In that case, the coupling key 116 could be integral with both legs 106, 108 and the back 110. Alternatively, the slot 78 could extend radially inwardly from the groove 77 and partially into the rail 67. The key 116 could then be integral with the leg 108 and the back 110. It is also within the scope of the present invention that the flange slot 102 and the rail slot 78 do not cooperate with each other to form a single keyway. Rather, the slots 102, 78 could function as separate keyways, and each coupling would include separate keys 116 to engage the separate keyways.

Each seal support 75a of the first air seal stage 57 has a front end 120 and a rear end 122, and each seal support 75b of the second air seal stage 59 has a front end 123 and a rear end 125. Each seal support front end 120, 123 includes an axially extending flange 124, 127, respectively, whose axial length L is at least equal to the axial length $L_c$ of the coupling leg 108 (FIG. 3). Each flange 124, 127 has an axially extending cutout 126 therein, and the circumferential width W of the cutout 126 is slightly greater than the circumferential width $W_c$ of the coupling 104. The rear end 122 of each first stage seal support 75a has an axially extending flange 130 and a lip 132 extending radially outwardly from the flange 130.

The rear end 125 of each second stage seal support 75b has a radially outwardly extending leg 136.

In this embodiment, the front flange 124 of each first stage seal support 75a is disposed within the groove 77a in the rail 67a, and the flange cutout 126a straddles the coupling 104a. An axially forward facing surface 138a of the cutout 126a is adjacent to the axially rearward facing surface 140a of the coupling back 110a. The radially facing surfaces 79a, 81a of the groove 77a contact radially facing surfaces 142a of the flange 124 and prevent relative radial movement between the flange 124 and the engine case 40. The rear flange 130 of each first seal support 75a overlies the surface 64b of the rail 65b, and is radially trapped between the surface 64b and the radially facing surface 144b of the second stage cluster front foot 90b. The flange lip 132 is held between the axially facing surface 146b of the rail 65b and the axially facing surface 92b between the cluster front feet 90b, 91b. In this manner, each first stage seal 61 is fixed axially and radially relative to the case 40; and contact of the seal front flange 124 with the coupling 104a (at the cutout surface 138a) prevents axial movement of the coupling 104a during engine operation.

The front flange 127 of each second stage seal 63 is disposed within the groove 77b of the rail 67b, and straddles each coupling 104b in the same manner that the first stage front flange 124 is disposed within the groove 77a. Preferably, each seal 61, 63 has a radially extending lip 139 adjacent to the rear side of the cutout 126. The lip 139 provides additional contact area between the coupling 104 and each seal 61, 63 along a radial and circumferential plane during engine operation, to insure that the coupling 104 does not move axially.

The rear flange 125 of each second stage seal 63 is secured to a radially outwardly extending flange 147 of the case 40 by the bolts 148 which pass through the flange leg 136. In this manner, each second stage seal 63 is fixed axially and radially relative to the case 40, and prevents axial movement of the couplings 104b.

Forces exerted on the vane clusters 46 during engine operation may cause the cluster rear feet 98 to tilt and move radially away from the rail 67. In the preferred embodiment of the present invention, and as shown in FIG. 3, the slot 102 in each rear foot 98 is located such that the keyway that it forms is near the interface 84 between adjacent vane clusters 46. The coupling 104 is long enough to overlap the interface 84, and to limit relative radial movement between the adjacent feet 98 and the rail 67.

Figure 1:
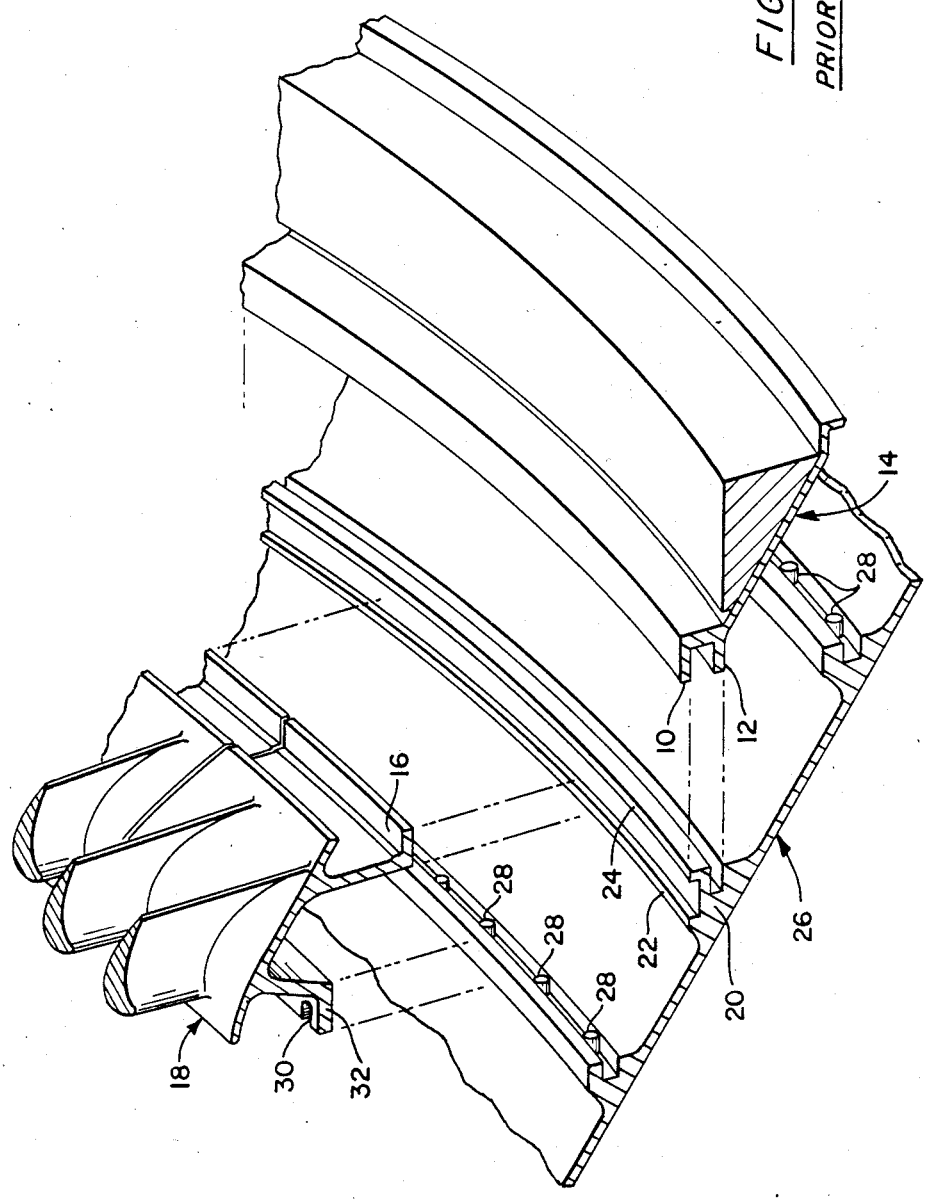
FIG. 1 is a perspective, exploded view of a portion of a turbine section of a gas turbine engine, showing a vane attachment construction of the prior art.

FIG. 2 shows only two stages of turbine vane clusters 46 secured to the engine case 40 in accordance with the present invention. However, in the turbine section of a 40,000 lb. thrust gas turbine engine, tests have shown that at least four adjacent stages of turbine vane clusters can be secured to the engine case in accordance with the present invention. The four stages used one hundred forty (140) couplings. Compared to the prior art construction shown in FIG. 1, the present invention eliminates the flanges 10, 12 on the seal 14, the ridge 22 on the rail 20, over two hundred thirty (230) leading edge pins 28, and a significant amount of machining. This substantially decreased engine costs. The couplings used in the four stages were identical and interchangeable with each other. The couplings were fabricated by casting techniques common in the art. Each stage of air seals disposed between adjacent stages of vane clusters was trapped between the clusters, and needed no additional means of attachment. Only the most rearward seal stage was bolted to the case in the manner shown in FIG. 2.

Although the invention has been shown and described with respect with a preferred embodiment thereof, it should be understood by those skilled in the art that other various changes and omissions in the form and detail thereof may be made therein without departing from the spirit and scope of the invention.

I claim:

1. A gas turbine engine assembly, comprising:
   (a) an annular engine case having an annular, axially extending rail thereon, said rail having a plurality of axially extending, circumferentially spaced apart slots therein;
   (b) an annular engine component comprising a plurality of arcuate, circumferentially disposed segments, each segment having an axially extending flange in overlapping contact with said rail, each flange having an axially extending slot therein radially aligned with one of said rail slots to form a keyway; and
   (c) a plurality of couplings, each coupling having two spaced apart legs, both legs extending axially from and integral with a back, said legs and back forming a C-shaped structure, wherein said overlapping portions of said rail and at least one of said segment flanges are disposed between and are contacted by said legs of one of said couplings, and said legs of said one coupling prevent relative radial movement between said rail and at least one of said flanges, and wherein each coupling has an axially extending key disposed between said legs and integral with at least one of said legs or with said back, wherein said key of one of said couplings engages one of said keyways and prevents relative circumferential movement between said rail and at least one of said flanges.

2. The assembly of claim 1, wherein said engine component is a stator assembly, and each of said segments is a stator vane unit having at least one radially extending vane.

3. The assembly of claim 2, wherein adjacent vane unit flanges have an interface extending axially therebetween, and said legs of one of said couplings overlie each interface so as to prevent relative radial movement between said adjacent vane units and said rail.

4. The assembly of claim 3, wherein each coupling back has an axially facing front surface in opposing relation to said rail, and a rear surface facing axially away from said rail, said assembly including annular stop means fixed axially relative to said case and abutting said rear surface of each of said couplings to limit axially rearward movement of said couplings relative to said rail.

5. The assembly of claim 3, wherein said case rail includes an annular, radially inwardly extending lip having an axially facing front surface, and each of said rail slots extends axially through said lip, and wherein each of said vane flanges has an axially facing rear surface which abuts said lip front surface such that axially rearward movement of each of said vane units relative to said rail is prevented.

6. The assembly of claim 1, wherein said coupling key is integral with one of said legs and with said back.

7. The assembly of claim 1, wherein said rail and each of said segment flanges are disposed between the legs of said couplings, whereby relative radial movement between said rail and each segment is prevented, and wherein each keyway is engaged by one of said coupling keys, whereby relative circumferential movement between said rail and each segment is prevented.

* * * * *